(12) United States Patent
Yasunaga et al.

(10) Patent No.: US 7,187,510 B2
(45) Date of Patent: Mar. 6, 2007

(54) METHOD OF MAGNETIC TRANSFER TO FLEXIBLE MEDIUM

(75) Inventors: Tadashi Yasunaga, Kanagawa-ken (JP); Kazuhiro Niitsuma, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 380 days.

(21) Appl. No.: 10/322,415

(22) Filed: Dec. 19, 2002

(65) Prior Publication Data

US 2003/0117735 A1 Jun. 26, 2003

(30) Foreign Application Priority Data

Dec. 20, 2001 (JP) .............................. 2001-387812

(51) Int. Cl.
*G11B 5/86* (2006.01)

(52) U.S. Cl. .......................................... 360/16; 360/17

(58) Field of Classification Search ................. 360/15, 360/16, 17, 97.04, 99.01, 281
See application file for complete search history.

(56) References Cited

U.S. PATENT DOCUMENTS

| | | | | |
|---|---|---|---|---|
| 2,332,803 A * | 10/1943 | Lorig | ........................... | 72/205 |
| 3,072,519 A * | 1/1963 | Salzman | ..................... | 156/200 |
| 3,578,517 A * | 5/1971 | Lapp et al. | ................... | 156/40 |
| 4,449,916 A * | 5/1984 | Ito et al. | .................. | 425/174.4 |
| 4,539,220 A * | 9/1985 | Martinelli | ................... | 427/502 |
| 4,562,391 A | 12/1985 | Inoue | | |
| 4,644,416 A | 2/1987 | Yamada | | |
| 4,946,534 A | 8/1990 | Honda et al. | | |
| 5,324,188 A * | 6/1994 | Santoh et al. | ................ | 425/363 |
| 5,516,469 A * | 5/1996 | Santoh et al. | .............. | 264/1.33 |
| 5,705,044 A * | 1/1998 | Washburn et al. | ...... | 204/295.25 |
| 5,872,758 A * | 2/1999 | Put et al. | ....................... | 369/85 |
| 5,964,114 A * | 10/1999 | Noe et al. | ....................... | 72/54 |
| 6,113,753 A * | 9/2000 | Washburn | .............. | 204/192.15 |
| 6,347,016 B1 | 2/2002 | Ishida et al. | | |
| 6,772,507 B2 * | 8/2004 | Aoki | ........................ | 29/603.16 |
| 6,874,724 B2 * | 4/2005 | Muller et al. | ............. | 242/534.1 |
| 2002/0075583 A1* | 6/2002 | Ishida et al. | ................... | 360/17 |

FOREIGN PATENT DOCUMENTS

| | | |
|---|---|---|
| DE | 100 22 269 A1 | 11/2001 |
| EP | 0 268 390 A2 | 5/1988 |
| EP | 0 678 859 A1 | 10/1995 |
| GB | 880570 A | 10/1961 |
| GB | 1 285 725 A | 8/1972 |
| JP | 63-783623 | 7/1988 |
| JP | 64-88920 A | 4/1989 |
| JP | 01-192019 A | 8/1989 |
| JP | 2000-285449 A | 10/2000 |
| JP | 2002-298340 A | 10/2002 |

\* cited by examiner

*Primary Examiner*—Wayne Young
*Assistant Examiner*—Dismery Mercedes
(74) *Attorney, Agent, or Firm*—Sughrue Mion, PLLC

(57) ABSTRACT

A signal such as a servo tracking signal is recorded on a flexible slave medium by magnetic transfer. When forming the flexible slave medium of a magnetic strip in a continuous length, the signal is recorded on the magnetic strip by patterned master magnetic transfer prior to or simultaneously with shaping the magnetic strip into a desired shape.

19 Claims, 2 Drawing Sheets

METHOD OF MAGNETIC TRANSFER TO FLEXIBLE MEDIUM

BACKGROUND OF THE INVENTION

1. Field of the Invention

This invention relates to a method of making a flexible magnetic medium of a raw magnetic sheet in a continuous length comprising a base sheet and a magnetic layer, and more particularly to a method of recording a desired signal such as a servo signal on such a flexible magnetic medium by magnetic transfer.

2. Description of the Related Art

In order to realize a high capacity magnetic recording medium such as a flexible disc or a backup tape for a computer, so-called servo tracking technique for causing a magnetic head to accurately trace such narrow data tracks and reproduce the data at a high S/N ratio is necessary. Servo tracking signals employed to perform the servo tracking are to positioning the magnetic head in recording and reproduction and are recorded in advance on the flexible magnetic medium.

At present, servo tracking signals are recorded by the use of a servo track writer one medium by one medium, and one servo track by one servo track. This servo tracking signal recording process takes a long time, and as the recording density is increased in order to increase the memory capacity, the servo tracking signal recording process takes a longer time. Accordingly, the servo tracking signal recording process occupies a large part of the production cost and there has been a demand for a method to effect the servo tracking signal recording process at lower cost.

In order to meet this demand, there has been proposed magnetic transfer technique in which signals are simultaneously recorded over the entire area of the medium. As disclosed, for instance, in Japanese Unexamined Patent Publication No. 63(1988)-183623 and U.S. Pat. No. 6,347,016, in the magnetic transfer method, a magnetization pattern representing the information (e.g., servo tracking signals) carried by a master information carrier is magnetically transferred from the master information carrier to a magnetic recording medium (a slave medium) by applying a transfer magnetic field to the slave medium and the master information carrier in close contact with each other.

Though there have been known various magnetic transfer techniques for transferring information to hard magnetic media, there have been hardly known magnetic transfer techniques for transferring information to flexible magnetic media.

Flexible magnetic media are generally produced as follows. A long raw magnetic sheet (roll) is first formed by forming a magnetic layer on one or both sides of a base sheet in a continuous length by coating (including calendering and/or curing as desired), deposition or sputtering. Then the long raw magnetic sheet is slit into magnetic strips of a desired width as necessary and punched into a magnetic blank of a desired shape such as a disc. The punched magnetic blank is incorporated in a structural part such as a cartridge casing. Then the magnetic sheet is formatted and examined. The servo signals are recorded in the formatting process.

There has been known a magnetic transfer using a patterned master information carrier. In this magnetic transfer (will be referred to "patterned master magnetic transfer", hereinbelow), a patterned master information carrier provided with an irregularity pattern or an embedded pattern representing the signals to be transferred and with a magnetic layer formed on at least the top surface of the irregularity pattern or the embedded pattern is brought into close contact with a slave medium, and a transfer magnetic field is applied to the slave medium and the patterned master information carrier, thereby transferring the signals to the slave medium. The patterned master magnetic transfer is advantageous in that the signals can be written in a short time and since the signals are statically written, signal quality output from the slave medium is high. However, there has not been disclosed a preferred form of applying the patterned master magnetic transfer to flexible media.

Difficulties encountered in an attempt to magnetically transfer the signals to flexible media by the patterned master magnetic transfer mainly lie in positioning of the patterned master information carrier and the slave media with respect to each other and in handling of the flexible media.

For example, whereas, in the case where the slave medium is, for instance, a hard disc having a hard substrate (base sheet), the position of the slave medium relative to the signals to be transferred or the patterned master information carrier can be determined on the basis of the outer or inner dimension of the disc, this technique cannot be used in the case where the slave medium is a flexible medium since the flexible medium is apt to be deformed. Though, this problem may be overcome by positioning the slave medium with respect to the patterned master information carrier on the basis of the center core fixed to the center of the flexible medium, this approach is unsatisfactory in the following points. The accuracy in positioning the slave medium with respect to the patterned master information carrier can deteriorate due to fluctuation in the dimension of the center core and/or fluctuation of the position of the center core relative to the flexible medium. Further, when the signals are transferred to the flexible medium after the center core is fixed, the center core prevents the flexible medium from being brought into close contact with the patterned master information carrier and narrows the area on the flexible medium where the signals can be transferred, which results in a narrow recording area of the flexible medium.

Further, due to its flexibility, handling of the flexible medium after punching is difficult. Holding the punched flexible medium by a suction pad at the recording area before the signals are transferred can involve adhesion of foreign materials to the recording area and/or deformation of the flexible medium, which results in deterioration of quality of the transferred signals. Further, the non-recording area where the signals are not transferred is too small to hold the flexible medium by a suction pad at the non-recording area. This becomes more serious as the size of the flexible medium is reduced.

SUMMARY OF THE INVENTION

In view of the foregoing observations and description, the primary object of the present invention is to provide an improved method of magnetic transfer which can magnetically transfer signals from a master information carrier to a flexible slave medium without difficulties in positioning and/or handling of the flexible slave medium.

In accordance with the present invention, there is provided a method of magnetic transfer to a flexible slave medium from a patterned master information carrier bearing thereon a signal such as a servo tracking signal characterized in that when forming the flexible medium of a magnetic strip, comprising a base sheet in a continuous length and a magnetic layer formed on one or both sides of the base sheet, the signal is recorded on the magnetic strip by patterned master magnetic transfer prior to or simultaneously with shaping the magnetic strip into a desired shape.

It is preferred that the signal be recorded on the magnetic strip by patterned master magnetic transfer with the magnetic strip applied with a constant tension in both its longitudinal direction and its transverse direction.

When the signal is recorded on the magnetic strip by patterned master magnetic transfer simultaneously with shaping the magnetic strip, it is preferred that the magnetic strip be shaped with the magnetic strip held in the position in which the signal is recorded or the signal is recorded on the magnetic strip with the magnetic strip held in the position in which the magnetic strip is shaped.

Further it is preferred that the magnetic strip be obtained by slitting a wide long raw magnetic sheet in a continuous length into strips of a predetermined width. In the case of a flexible disc, a center core is fixed to the shaped fractions of the magnetic strip.

Further, magnetic transfer of the signals to the magnetic strip and shaping of the magnetic strip may be effected by moving processing units mounted on a plurality of arms with the magnetic strip kept fixed in a processing position, or may be effected by intermittently moving the magnetic strip from one step to another.

The present invention may be applied to a flexible magnetic tape such as a computer backup tape as well as a flexible magnetic disc.

It is preferred that the magnetic transfer be carried out by initially DC-magnetizing the magnetic strip in a direction parallel to the tracks or in a direction perpendicular to the tracks and applying a transfer magnetic field in a direction opposite to the direction of the initial DC magnetization to the magnetic strip and the patterned master information carrier with the magnetic strip and the patterned master information carrier held in a close contact with each other.

In accordance with the present invention, since the signal may be transferred from the patterned master information carrier to the magnetic strip with the magnetic strip positioned with respect to the patterned master information carrier and the flexible medium itself need not be positioned with respect to the master information carrier, said problem of positioning cannot arise, and at the same time, since the flexible medium itself is not handled prior to the magnetic transfer, said problem of handling can be avoided without deteriorating the quality of the transferred signal.

That is, strictly speaking, positioning of the flexible medium and the master information carrier becomes unnecessary. Instead the signal-transferred area of the magnetic strip must be aligned with the punched area. This positioning can be done on the basis of mechanical accuracy of the positions of the magnetic transfer unit and the punching unit. Even if the signal-transferred area is displaced with respect to the punched area, the displacement is merely a displacement between the centers, which can be easily corrected by the servo tracking function of the flexible media drive.

Further, since no center core is mounted upon the magnetic transfer, the signals can be transferred to the magnetic strip substantially over the entire area thereof, and accordingly, the flexible medium can be larger in recording area, which increases recording capacity of the flexible medium and makes it feasible to record a special signal other than data on an area around the inner periphery of the flexible medium.

DESCRIPTION OF THE PREFERRED EMBODIMENTS

Figure 1:
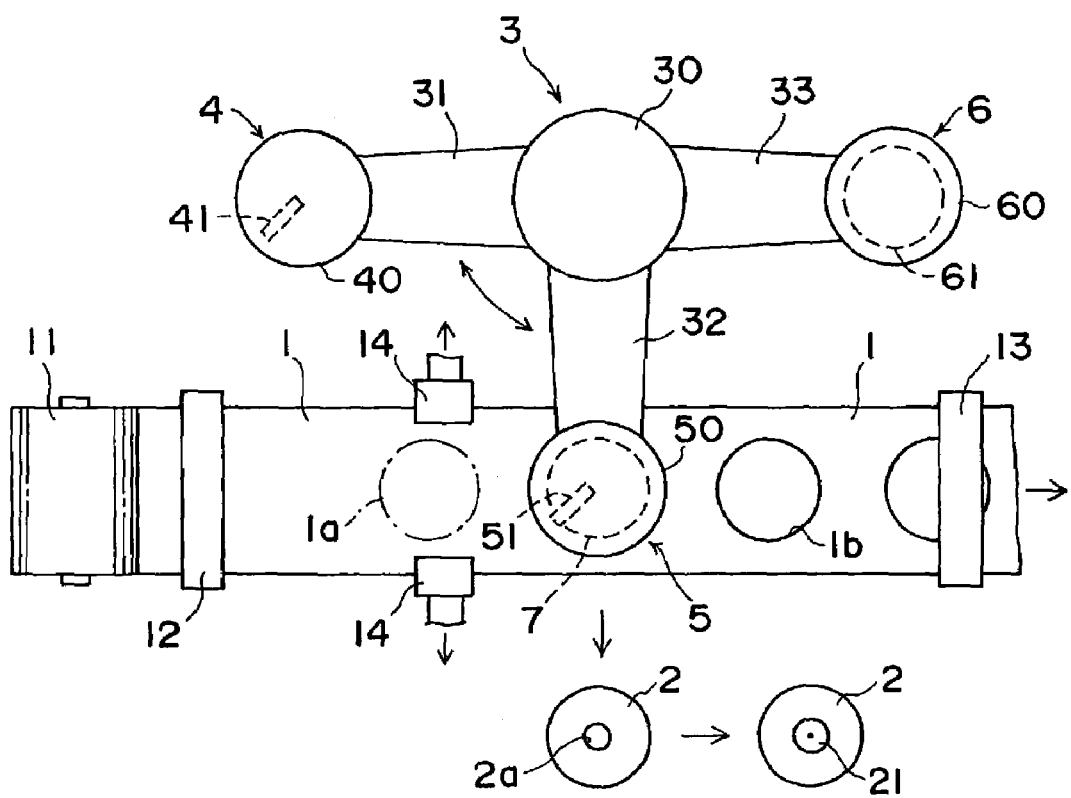
FIG. 1 is a plan view for illustrating a magnetic transfer method in accordance with a first embodiment of the present invention.
Figure 2:
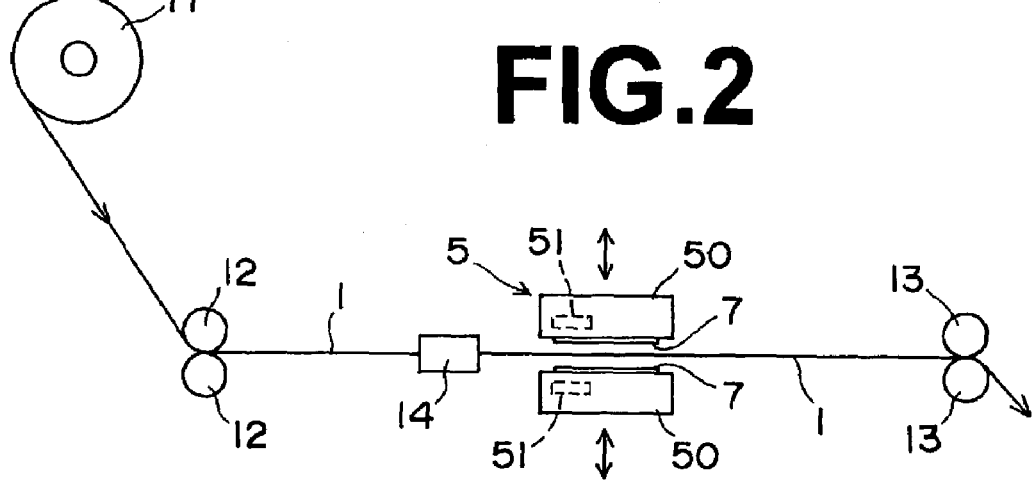
FIG. 2 is a front view of FIG. 1.

As shown in FIG. 1, signals are transferred to a magnetic strip 1 by a magnetic transfer method in accordance with an embodiment of the present invention. The magnetic strip 1 comprises a long base sheet in a continuous length and a magnetic layer formed on the base sheet and is rolled out from a magnetic strip roll 11. The magnetic strip 1 rolled out from the roll 11 is applied with a constant tension in the longitudinal direction thereof by front and rear tension rollers 12 and 13. At the same time, the magnetic strip 1 is applied with a constant tension in the direction of width thereof by a pair of pinchers 14. It is preferred that the pinchers 14 hold the magnetic strip 1 at portions which will be thrown out after punching to be described later.

A processing system 3 for magnetic transfer and punching is disposed beside the unrolled magnetic strip 1. The processing system 3 comprises first to third arms 31 to 33 which are rotatable about a rotary shaft 30. An initial magnetization unit 4 for applying an initial DC magnetic field is provided on the free end portion of the first arm 31, a. magnetic transfer unit 5 for applying a transfer magnetic field is provided on the free end portion of the second arm 32 and a punching unit 6 for punching a disc from the magnetic strip 1 is provided on the free end portion of the third arm 33. In this embodiment, prior to punching a flexible medium 2 from the magnetic strip 1, desired signals are recorded on the magnetic strip 1 by magnetic transfer by the use of a patterned master information carrier 7. In these steps, the magnetic strip 1 is held stationary in a processing position and the first to third arms 31 to 33 are rotated to bring the initial magnetization unit 4, the magnetic transfer unit 5 and the punching unit 6 to the magnetic strip 1 in sequence.

The initial magnetization unit 4 applies an initial magnetic field to the magnetic strip 1 to initially DC-magnetize the magnetic strip 1 in a direction parallel to the tracks or in a direction perpendicular to the tracks. The initial magnetization unit 4 comprises upper and lower holders 40 (the lower holder is not shown) which are respectively movable toward and away from the upper and lower sides of the magnetic strip 1 and a magnetic field application means 41. The magnetic field application means 41 comprises a pair of permanent magnets or electromagnets which pinch the long raw magnetic sheet 1 from opposite sides thereof and apply a magnetic field thereto. That is, the magnetic field application means 41 is rotated so that a magnetic field is applied to a part 1a of the magnetic strip 1, which is to be punched into a flexible disc 2, in a direction parallel to the tracks or in a direction perpendicular to the tracks, thereby initial-magnetizing the entire area to which the signals are to be transferred.

The magnetic transfer unit 5 applies a transfer magnetic field to the initial-magnetized part 1a of the magnetic strip 1 in a direction opposite to the direction of the initial DC magnetization with the magnetic layer of the magnetic strip 1 in close contact with the patterned side (the side bearing thereon the information) of the patterned master information carrier 7. The magnetic transfer unit 5 comprises upper and lower holders 50 (the lower holder is not shown) which are respectively movable toward and away from the upper and lower sides of the magnetic strip 1 and a magnetic field application means 51. The holder 50 brings the patterned master information carrier 7 into close contact with the magnetic strip 1 and the magnetic field application means 51 comprises a pair of permanent magnets or electromagnets which pinch the magnetic strip 1 from opposite sides thereof and apply a magnetic field thereto. The magnetic field application means 51 is rotated so that the transfer magnetic field is applied to the entire area to which the signals are to be transferred.

Though not shown, the patterned master information carrier 7 comprises a base sheet 3a having a micro irregularity pattern provided with a magnetic layer. The irregularity pattern represents information to be transferred to flexible magnetic media (flexible slave media) and when a transfer magnetic field is applied, desired signals represented by the pattern in which the magnetic layer of the magnetic strip 1 is in contact with the magnetic layer of the patterned master information carrier 7 (corresponding to the protruding portions of the irregularity pattern) and is away from the same (corresponding to the spaces between protruding portions of the irregularity pattern) are magnetically transferred to the tracks of the magnetic layer of the magnetic strip 1. The signals may be recorded on the magnetic strip 1 either in in-plane recording or in perpendicular recording, and the initial magnetic field and the transfer magnetic field suitable for the in-plane recording or the perpendicular recording is applied.

The punching unit 6 comprises a punch 61 and a die (not shown) respectively mounted on upper and lower holders 60 (the lower holder is not shown) which are respectively movable toward and away from the upper and lower sides of the magnetic strip 1. The punch 61 and the die pinch the magnetic strip 1 from opposite sides thereof and punch a flexible disc 2 from the magnetic strip 1 with a circular opening 1b left in the magnetic strip 1. The flexible disc 2 is provided with an inner opening 2a for mounting a center core 21 as desired.

The center core 21 is generally of metal, and bonded to the flexible disc 2, for instance, by adhesive or a double-sided adhesive tape with the centers of the inner opening 2a of the flexible disc 2 and the center core 21 aligned with each other. Thereafter, the flexible disc 2 with the center core 21 is incorporated in a casing, whereby a cartridge is assembled.

The magnetic strip 1 is generally produced as follows. A wide raw magnetic sheet (roll) is first formed by forming a magnetic layer on one or both sides of a base sheet in a continuous length by coating (including calendering and/or curing as desired), deposition or sputtering. Then the wide raw magnetic sheet is slit into magnetic strips 1 of a desired width by a slitter. Signals can be recorded at a high density on the in in-plane recording or perpendicular recording. The magnetic layer of the magnetic strip 1 is provided with a magnetic anisotropy conforming to the recording system employed, in-plane recording or perpendicular recording.

In the embodiment described above, the problem of positioning and handling the flexible medium is overcome by transferring the signals to the magnetic strip 1 prior to punching the flexible medium 2 from the magnetic strip 1. Instead the signal-transferred area of the magnetic strip 1 must be aligned with the punched area. The displacement of the position of the magnetic transfer unit 5 with respect to the position of the punching unit 6 can be mechanically suppressed within 10 µm. Such a displacement is merely a displacement between the centers and can be easily corrected by the servo tracking function or the like of the flexible media drive.

Figure 3:
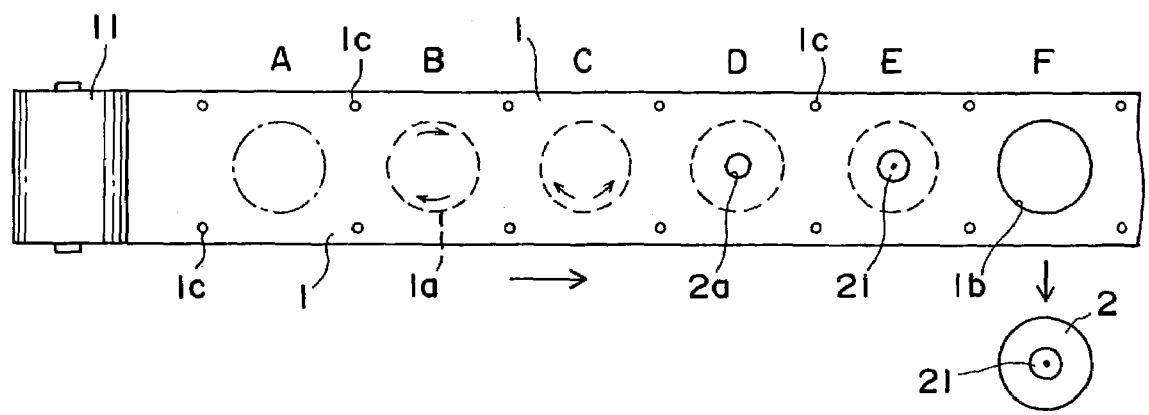
FIG. 3 is a view for illustrating a magnetic transfer method in accordance with a second embodiment of the present invention.

FIG. 3 shows a magnetic transfer method in accordance with another embodiment of the present invention. In FIG. 3, the processing system and the like are abbreviated.

The flexible magnetic strip 1 is rolled out from the roll 11 and intermittently conveyed to steps A to F along a line. Though not shown in FIG. 3, processing units are disposed at the steps and the magnetic transfer step is carried out prior to the punching step. Further, though not shown in FIG. 3, constant tensions are applied to the magnetic strip 1 in both the longitudinal direction and the transverse direction of the magnetic strip 1 by tension rollers and the pinchers similar to those shown in FIG. 1.

At the first step A, positioning marks 1c (e.g., perforations) for positioning the magnetic strip 1 with respect to the processing unit in the processing position at the steps. At the second step B, the initial magnetization unit 4 applies an initial magnetic field to the magnetic strip 1 to initially DC-magnetize the magnetic strip 1 in a direction parallel to the tracks of a part 1a of the magnetic strip 1, which is to be punched into a flexible disc 2, or in a direction perpendicular to the tracks. At the third step C, the magnetic transfer is effected by applying a transfer magnetic field to the patterned master information carrier 7 and the magnetic strip 1 kept in a close contact with each other. At the fourth step D, an inner opening 2a for mounting a center core 21 is formed at the center of the part 1a. At the fifth step E, the center core 21 is bonded to the magnetic strip 1 at the inner opening 2a. At the sixth step F, a flexible disc 2 with the center core 21 is punched out from the magnetic strip 1.

Also in this embodiment, the problem of positioning and handling the flexible medium is overcome by transferring the signals to the magnetic strip 1 prior to punching the flexible medium 2 from the magnetic strip 1. Instead positioning of the magnetic strip 1 with respect to the processing units becomes necessary at each step. However, this positioning can be easily and accurately done by providing the positioning marks 1c at portions of the magnetic strip 1 which will be thrown out after punching.

Though, in the embodiments described above, the magnetic transfer process is carried out prior to the punching step, the magnetic transfer process and the punching step may be simultaneously carried out by providing the punching unit 6 together with the magnetic transfer unit 5.

In some cartridges, the flexible disc 2 is not provided with a center core 21.

The patterned master information carrier 7 comprises a base sheet formed of nickel, silicon, crystal, glass, aluminum, alloys, ceramics, synthetic resin or the like. The irregularity pattern on the patterned master information carrier 7 can be formed, for instance, by the use of stamper method or photo-fabrication. In the stamper method, a photo-resist layer is first formed on a smooth glass plate (or a smooth crystal plate), and a laser beam (or an electron beam) modulated according to the servo signal is projected onto the photo-resist layer and the part of the photo-resist layer exposed to the laser beam is removed, thereby obtaining a matrix with an irregularity pattern of the photo-resist left. Then the surface of the matrix is plated (electroforming), and a base sheet having an irregularity pattern is formed on the matrix and separated from the matrix. The base sheet as it is may be used as a patterned master information carrier or may be used as a master information carrier after forming a non-magnetic layer, a soft magnetic layer and a protective layer as desired.

Otherwise, the matrix may be plated to form a second matrix having a reversed irregularity pattern and a base sheet may be formed on the basis of the second matrix. Further, a third matrix having an irregularity pattern reverse to that of the second matrix may be formed, and a base sheet may be formed on the basis of the third matrix. Further, a matrix may be first formed by etching the glass plate with an irregularity pattern of the photo-resist, and a base sheet may be formed by the use of the matrix in the same manner as described above.

What is claimed is:

1. A method of magnetic transfer to a flexible slave medium from a patterned master information carrier bearing thereon a signal characterized in that when forming the flexible slave medium of a magnetic strip, comprising a base sheet in a continuous length and a magnetic layer formed on one or both sides of the base sheet, the signal is recorded on the magnetic strip by patterned master magnetic transfer prior to or simultaneously with shaping the magnetic strip into a desired shape, in which the signal is recorded on the magnetic strip by patterned master magnetic transfer with the magnetic strip applied with a constant tension in both its longitudinal direction and its transverse direction.

2. A method of magnetic transfer as defined in claim 1 in which the magnetic strip is shaped with the magnetic strip held in the position in which the signal is recorded.

3. A method of magnetic transfer as defined in claim 1 in which the signal is recorded on the magnetic strip with the magnetic strip held in the position in which the magnetic strip is shaped.

4. A method of magnetic transfer as defined in claim 1 in which the magnetic strip is obtained by slitting a wide long raw magnetic sheet in a continuous length into strips of a predetermined width.

5. A method of magnetic transfer as defined in claim 1 in which magnetic transfer of the signal to the magnetic strip and shaping of the magnetic strip are effected by moving processing units mounted on a plurality of arms with the magnetic strip kept fixed in a processing position.

6. A method of magnetic transfer as defined in claim 5, wherein each of the plurality of arms extends out from a common rotating base.

7. A method of magnetic transfer as defined in claim 5, wherein the processing units comprise a master information carrier disposed on one of the plurality of arms and a punching unit disposed on another of the plurality of arms.

8. A method of magnetic transfer as defined in claim 7, wherein each of the plurality of arms extends out from a common rotating base.

9. A method of magnetic transfer as defined in claim 1 in which magnetic transfer of the signal to the magnetic strip and shaping of the magnetic strip are effected by intermittently moving the magnetic strip from one step to another.

10. A method of magnetic transfer as defined in claim 1 in which the flexible slave medium is a flexible disc and a center core is fixed to the flexible disc after the magnetic transfer of the signal.

11. A method of magnetic transfer as defined in claim 1 in which the shaping of the magnetic strip is punching.

12. A method of magnetic transfer as defined in claim 1 in which the magnetic transfer is carried out by initially DC-magnetizing the magnetic strip in a direction parallel to the tracks or in a direction perpendicular to the tracks and applying a transfer magnetic field in a direction opposite to the direction of the initial DC magnetization to the magnetic strip and the patterned master information carrier with the magnetic strip and the patterned master information carrier held in a close contact with each other.

13. A method of magnetic transfer as defined in claim 1, wherein the signal is recorded at an area of the magnetic strip and the shaping of the magnetic strip comprises punching out the area of the magnetic strip.

14. A method of magnetic transfer as defined in claim 1, wherein the shaping of the magnetic strip comprises punching out an area of the magnetic strip and the punched out area of the magnetic strip is the flexible slave medium.

15. A method of magnetic transfer as defined in claim 1, wherein the longitudinal direction is parallel to a conveyance direction of the magnetic strip and the transverse direction is substantially perpendicular to the conveyance direction.

16. A method of magnetic transfer as defined in claim 1 in which magnetic transfer of the signal to the magnetic strip and shaping of the magnetic strip are effected by moving processing units mounted on a plurality of arms with the magnetic strip kept fixed in a processing position.

17. A method of magnetic transfer as defined in claim 1 in which magnetic transfer of the signal to the magnetic strip and shaping of the magnetic strip are effected by intermittently moving the magnetic strip from one step to another.

18. A method of magnetic transfer to a flexible slave medium from a patterned master information carrier bearing thereon a signal, said method comprising the steps of:

rolling out a magnetic strip including a base sheet in a continuous length and a magnetic layer formed on one or both sides of the base sheet, from a roll by applying with a constant tension in the longitudinal direction thereof by a first tension roller and a second tension roller and applying with a constant tension in the direction of width thereof by a pair of pinchers;

shaping the magnetic strip into a desired shape as the flexible slave medium; and recording the signal on the magnetic strip by patterned master magnetic transfer, prior to or simultaneously with the step of shaping.

19. The method of magnetic transfer as defined in claim 18, wherein, in the step of shaping, the flexible slave medium is punched out from the magnetic strip by using a punching unit.

* * * * *